July 17, 1956 N. G. BUSCH 2,755,016
RESILIENT MOUNTING FOR BLOWER
Filed Dec. 27, 1954
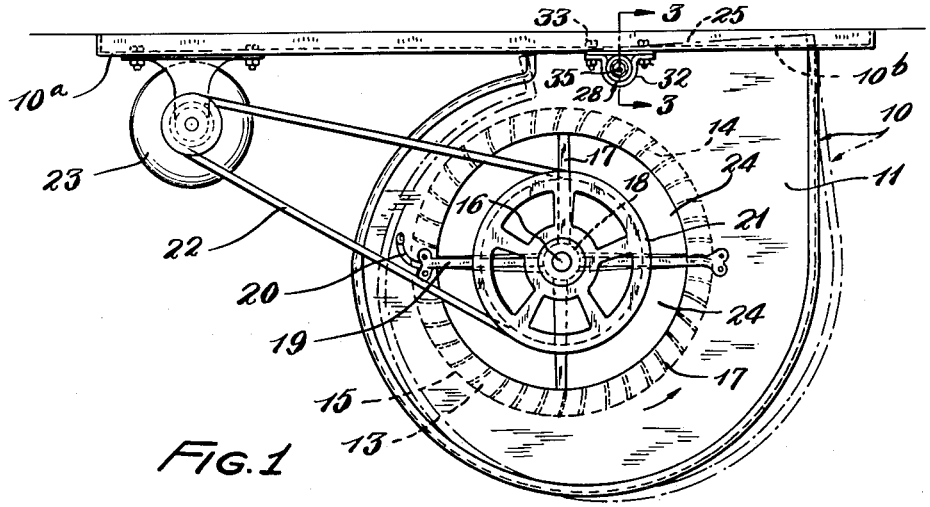
FIG.1
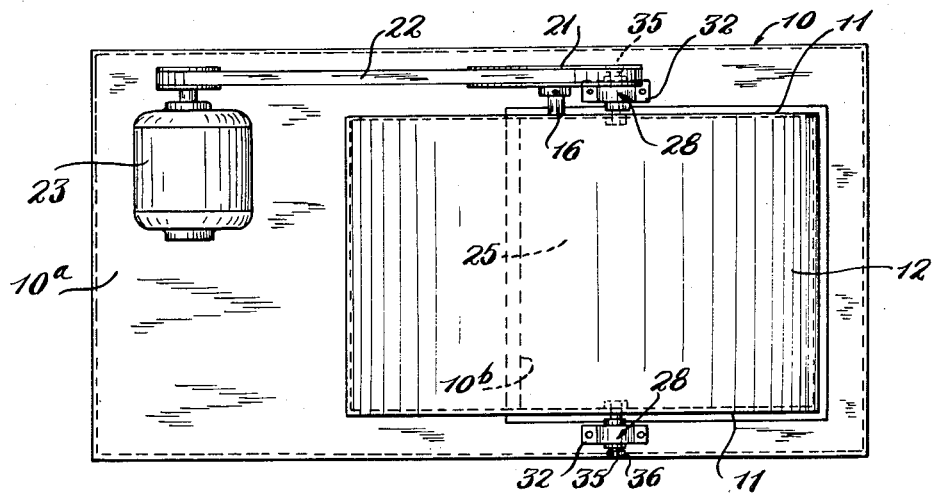
FIG.2
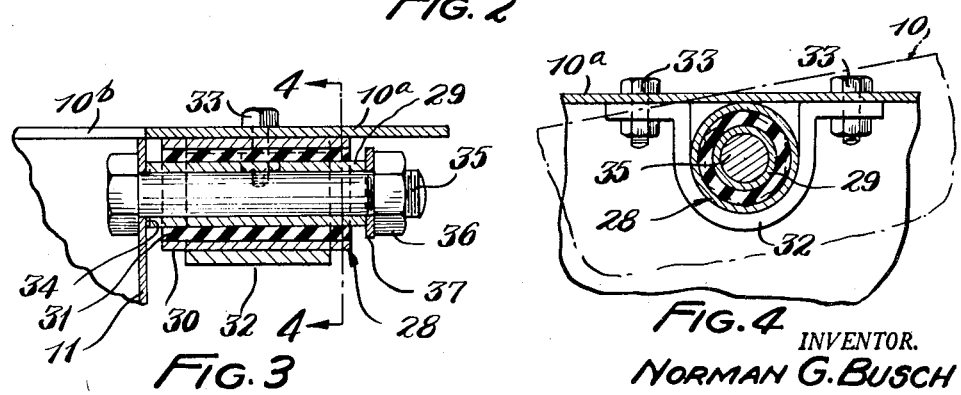
FIG.3
FIG.4
INVENTOR.
NORMAN G. BUSCH
BY Walter C. Kelsey
ATTORNEY

United States Patent Office 2,755,016
Patented July 17, 1956

2,755,016
RESILIENT MOUNTING FOR BLOWER

Norman G. Busch, Columbia Station, Ohio, assignor to Air Controls, Inc., Cleveland, Ohio, a corporation of Ohio Application December 27, 1954, Serial No. 477,610

4 Claims. (Cl. 230—117)

This invention relates to vibration dampeners or absorbing devices, and more particularly, to devices for mounting such devices as blowers, fans and the like, in such manner that the torsional and vibrating motions of such units are absorbed and isolated from the furnace or air conditioning units on which they may be mounted.

Blowers and fans of various types are commonly mounted in furnaces and air conditioning apparatus, and unless means are provided for absorbing vibrations caused by rotation thereof, from such air moving apparatus, the torsional and other vibrations are transmitted to the conditioning apparatus, and in some instances to the floor supporting the same, which obviously may set up undesirable vibrations and noises.

An object of this invention is to isolate torsional oscillating and other vibrations set up by various operating apparatus such as blowers, fans and the like, mounted on a furnace or air conditioning unit wall or panel.

Another object is to provide means for automatically taking up the slack on apparatus driving belts in accordance with various conditions of use and wear.

Other objects are to provide relatively inexpensive means for accomplishing the foregoing objects, such means being simple in operation quickly and easily installed, and sturdy and durable in use.

These and other objects will be apparent during the course of the following specification.

In the drawings forming a part of the specification:

Fig. 1 is a view of a blower assembly, incorporating my invention, and depending from a supporting surface;

Fig. 2 is a bottom view of the device shown in Fig. 1;

Fig. 3 is an enlarged sectional view taken on the line 3—3 of Fig. 1 illustrating the details of the vibration dampening device, while Fig. 4 is a sectional view taken on the line 4—4 of Fig. 3.

The embodiment of the invention disclosed herein comprises suspending a blower assembly on a pair of vibration dampeners at the line of the center of gravity of a blower assembly. The vibration dampeners comprise rigid inner and outer sleeves having an intermediate resilient sleeve of rubber disposed between them with its contacting surfaces bonded to said sleeves. For mounting the blower assembly on a furnace panel or the like the blower is first tilted away from the motor side of the device, the inner rigid sleeves of the vibration dampeners are then secured to the blower side walls. The outer rigid sleeves of the dampener are then secured to the blower support beyond final position and then the blower assembly is swung back slightly in such manner that when a driving belt is attached, the vibration dampener is wound up torsionally approximately 10 to 15 degrees. The foregoing construction results in the absorption or taking up of the torsional and other vibrations by the intermediate flexible rubber sleeve disposed between two rigid sleeves and also takes up the slack in the belt.

In the drawings, disclosing an illustrative embodiment of the invention, the numeral 10 refers to a blower assembly, suspended from a blower support member or panel having an opening 10b, and including two parallel side walls 11, suitably joined to a casing 12 extending around the edges of the side walls 11. The blower 10 is of the centrifugal squirrel cage type. A blower wheel 13 having a series of thin blades 14, suitably mounted in end rings 15, is operatively secured to a rotatable shaft 16 by means of spokes 17, the shaft 16 being suitably mounted in bearings 18 supported by brackets 19, supporting an oil tube 20, for supplying oil to said bearings 18, in a well known manner.

As shown in Fig. 1 a sheave 21 fixedly mounted on one end of the shaft 16, is connected by a V belt 22 to an electric motor 23, suitably mounted on the blower support panel 10a, for causing the blower wheel 13 to rotate on an horizontal axis, drawing in air through circular openings 24 in side walls 11 and forcing it out through an outlet opening 25, in a manner well known in the art.

Various types of motors and controls therefor may be used, the particular type of each being adapted to suit the specific requirements of each installation and as such features are well known in the art, they are now shown herein.

The blower assembly 10 may be located on furnace wall or in a convenient location on air conditioning apparatus. In conventional practice the blower assembly 10 might be bolted directly to a furnace wall, which would permit any oscillating or torsional motion to be transmitted directly to the furnace wall, creating undesirable vibrations and noises. I have discovered that the foregoing vibrations and noises may be substantially eliminated by suspending the blower assembly 10 on two vibration dampeners 28, one located at each side of the blower, which support it in the line of the center of gravity in such manner, that the blower may oscillate slightly as it is being driven by the motor 23, without transmitting such movements to the furnace wall.

Two vibration dampeners 28 comprise, an inner rigid sleeve 29 spaced from an outer rigid sleeve 30 by an intermediate flexible sleeve 31 of rubber, synthetic rubber or suitable plastic material having the properties of absorbing torsional and oscillating vibrations of the type caused by the rotation of a blower assembly or other equipment setting up vibrations of oscillating or torsional natures.

The vibrations dampeners 28 may be made by any suitable method, as for example, by a pressure friction bonding method, in which a fully cured rubber sleeve insert 31 is stretched between the inner sleeve 29 and the outer sleeve 30 in such manner that its thickness is reduced about 50% and its length is doubled, which may be accomplished by using a high speed press and a suitable lubricant, which is readily absorbed into the rubber sleeve 31 leaving a dry high friction surface between the rubber sleeve 31 and the metal sleeves 29 and 30.

The foregoing process produces a hydrostatic type of pressure between the contacting rubber and steel surfaces, which is on the order of 250 lbs. per sq. in. resulting in a coefficient of friction approaching unity, meaning that it requires at least 250 lbs. per sq. in. of shearing force to slip the rubber. Obviously the vibration dampeners 28 may be made by any other suitable process, as for example, by a vulcanized adhesion method.

The blower assembly 10 as illustrated is carried by a support panel 10a, but may be mounted on a furnace wall or the like, if desired. The sleeves 29, 30 and 31 of the dampening device 28 are mounted in brackets 32, extending partially around and secured to the support panel 10a by bolts 33. The inner sleeve 29 is slightly longer than the other two sleeves and may be provided with serrations 34 along one or more of the peripheral margins. One vibration dampener 28 is secured to each blower side wall 11, in the line of the center of gravity of the blower device 10 by means of bolts 35 having cooperating nuts 36 and washers 37, the nuts 36 being tightly drawn for securely retaining the inner end of each inner sleeve 29 against the blower walls 11, the serrations 34 on the end of the inner sleeves 29 causing the sleeve ends to be firmly embedded in the walls 11. When the foregoing is accomplished the blower device 10 is slightly off balance away from the belt 22, as illustrated by the broken lines in Figs. 1 and 4.

After securing the suspended blower assembly 10, as above described, it is clamped to the support panel 10a by means of bracket 32 retained by bolts 33, beyond its final position and then swung back. The belt 22 is then mounted around the sheave 21 which torsionally winds up the vibration dampeners 28. It has been found that advantageous mounting of the blower assembly 10 is obtained when the vibration dampeners 28 are wound up torsionally approximately 10 to 15 degrees. Due to tight adhesion of the intermediate rubber sleeve 31 to the metal surfaces of the sleeves 29 and 30 and the torsional winding up of the vibration dampeners 28, torsional and other motions produced by rotation of the blower wheel 13 are taken up and absorbed in the rubber sleeve 31 and are not transmitted to the support panel 10a, thereby substantially reducing vibration and noises. The disposition and arrangement of the vibration dampeners 28 also takes up any slack developing in the belt 22 in an obvious manner. By changing the diameter of the motor pulley the blower speed can be changed and the vibration dampeners will adjust the belt to proper tension. The vibration dampeners may be prewound to give correct belt tension at a predetermined full load. If this full load is exceeded, the vibration dampeners will reduce belt tension to allow slip down to blower speed equal to full load.

The invention herein disclosed is not limited to use with air moving equipment as it may be used advantageously with various types of equipment, having various oscillating pivotal joints, where various motions both torsional and in other planes, may be taken by flexing of the rubber firmly secured between the inner and outer sleeves of a vibration dampening device. For certain purposes the blower assembly 10 may be mounted on a panel or furnace wall instead of depending from such surfaces, as illustrated herein.

It will be apparent to those skilled in the art that the invention herein disclosed is illustrative only, and may be variously changed, used or modified, without departing from the spirit of the invention or sacrificing the advantages thereof, and that the invention is not limited thereto.

I claim:

1. A blower and vibration dampening means therefor comprising, a blower, a support member, vibration dampeners supporting said blower at the line of its center of gravity on said member, each dampener including at least a rigid sleeve and a coaxial flexible sleeve bonded to the contacting surface thereof, one of said sleeves being directly secured to said blower and the other sleeve being clamped to said support member, said flexible sleeve being torsionally wound up for absorbing vibrations produced by said blower and substantially preventing blower vibrations from being transmitted to said supporting member.

2. A blower and vibration dampening means therefor comprising, a blower, a support member, a motor suspended from said member, vibration dampeners suspending said blower at the line of its center of gravity on said member, and a driving belt operatively connecting said motor and blower, each dampener including at least a rigid sleeve and a coaxial flexible sleeve bonded to the contacting surface thereof, one of said sleeves being directly secured to said blower and the other sleeve being clamped to said support member, said flexible sleeve being torsionally wound up from 10 to 15 degrees for absorbing vibrations produced by said blower and substantially preventing blower vibrations from being transmitted to said supporting member.

3. A blower and vibration dampening means therefor comprising, a blower, a support member, a motor mounted on said member, a pair of vibration dampeners supporting said blower at the line of its center of gravity on said member, and a driving belt operatively connecting said motor and blower, each dampener including a rigid outer sleeve and a rigid inner sleeve separated by an intermediate sleeve bonded to the contacting surfaces of said inner and outer sleeves, one of said rigid sleeves being directly secured to said blower and the other rigid sleeve being clamped to said support member, said flexible sleeve being torsionally wound up approximately 10 to 15 degrees for absorbing vibrations produced by said blower and substantially preventing blower vibrations from being transmitted to said supporting member.

4. A blower and vibration dampening means therefor comprising, a blower, a support member, a motor suspended from said member, vibration dampeners suspending said blower at the line of its center of gravity on said member, and a driving belt operatively connecting said motor and blower, each dampener including a rigid outer sleeve and a rigid inner sleeve separated by a flexible intermediate sleeve bonded to the contacting surfaces of said rigid sleeves, one of said rigid sleeves being directly secured to said blower and the other rigid sleeve being clamped to said support member, said flexible sleeve being torsionally wound up for absorbing vibrations produced by said blower and substantially preventing blower vibrations from being transmitted to said supporting member.

No references cited.